F. A. PELLETIER.
MILKING STOOL.
APPLICATION FILED MAR. 15, 1913.
1,061,321.
Patented May 13, 1913.
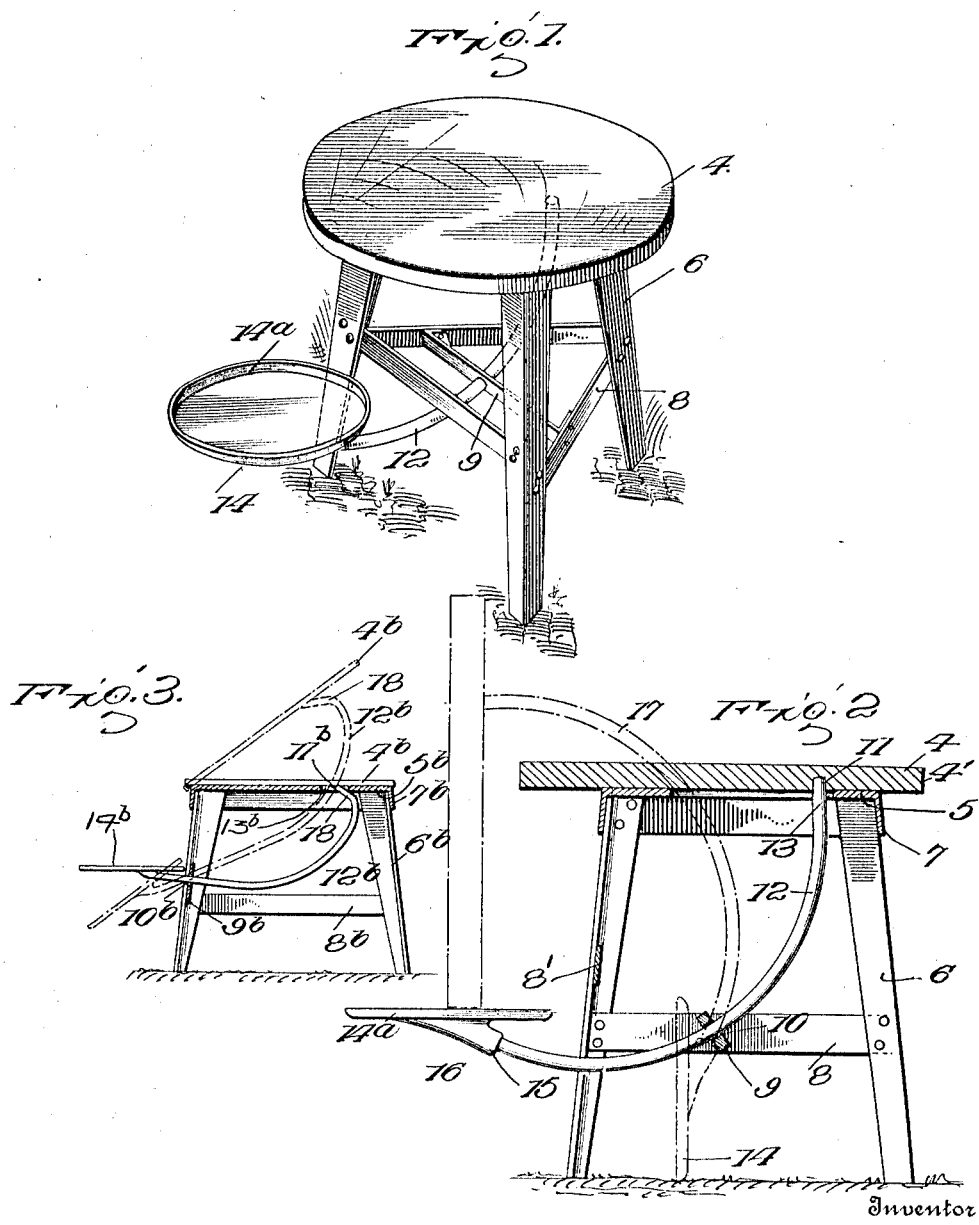

UNITED STATES PATENT OFFICE.

FREDRICK A. PELLETIER, OF ELGIN, ILLINOIS.

MILKING-STOOL.

1,061,321.  Specification of Letters Patent.  Patented May 13, 1913.

Application filed March 15, 1913. Serial No. 754,583.

*To all whom it may concern:*

Be it known that I, FREDRICK A. PELLETIER, a citizen of the United States, residing at Elgin, in the county of Kane and State of Illinois, have invented certain new and useful Improvements in Milking-Stools, of which the following is a specification.

This invention relates to stools and more particularly to that class of stools adapted for use in milking.

The object of my invention is to provide a milking stool so constructed as to obviate the necessity of the milker holding the milk pail between his knees.

A further object of my invention is to provide a milking stool which shall be light and easily carried from place to place.

A further object of my invention is to provide a milking stool of great durability and cheapness of manufacture.

With these and other objects in view my invention consists in the various combinations and relation of parts of a milking stool hereinafter described and more particularly pointed out in the appended claims.

Referring to the drawings wherein similar reference numerals indicate similar parts wherever used, Figure 1 is a perspective view of the preferred form of my invention; Fig. 2 is a vertical section taken through the preferred form of my invention; Fig. 3 is a vertical section of my invention showing a modified embodiment thereof.

The stool comprises a movable wooden seat portion 4 supported by a fixed metal seat 5, said fixed seat being supported by a plurality of legs 6, preferably formed of angle iron. These legs are riveted or otherwise fastened to a downturned flange 7 upon the metal seat 5. Between the legs and riveted thereto are metal brace rods 8 which serve to stiffen the structure and hold it rigid. Secured transversely between the brace rods 8 is a cross piece 9, so placed as to tilt toward the front of the stool, and provided with a centrally located aperture 10.

Secured to the movable wooden seat 4 at 11 is an arc shaped metal rod 12, which extends downwardly through an aperture 13 in the metallic seat 5 and through the opening 10 in the cross piece 9 and out under the brace rod 8″ which is slightly raised to permit the rod to pass. At its further end the rod 12 is provided with a pail holding portion 14 which is secured to the rod at 15 in any suitable manner, but preferably by a screw threaded sleeve 16.

When it is desired to use the device the operator takes the usual position for milking by seating himself upon the seat portion 4. The pail is placed upon the member 14 which holds it in the desired position by means of upturned flanges 14$^a$. When the milking operation is completed the pail is removed from the member 14 and the operator arises. By grasping the seat portion 4 at its outer edge 4′ and exerting an upward pressure thereon the members 4, 12 and 14 will assume the positions shown in dotted lines in Fig. 2, the rod 12 sliding within the openings 10—13, the member 14 moving rearwardly and downwardly until it assumes the vertical position shown, and the member 4 moving forwardly and downwardly assuming the position in Fig. 2. In this position the rod 12 provides at 17 a handle by means of which the entire device may be conveniently carried from place to place.

Fig. 3 illustrates a modified form of construction showing my invention as applied to a four legged stool constructed entirely of metal. This form of my device comprises a movable seat portion 4$^b$, a fixed seat portion 5$^b$ supported by legs 8$^b$ which are secured by rivets to the downturned flanges 7$^b$. Brace rods 8$^b$ are secured between the legs. The forward brace rod 9$^b$ of the modified construction is slightly raised above the level of the remaining brace-rods and is provided with a central aperture 10$^b$. Secured to the movable seat portion 4$^b$ at 11$^b$ is an arc shaped rod 12$^b$ which passes loosely through an aperture 13$^b$ in the fixed seat portion 5$^b$ and downwardly and forwardly through the opening 10$^b$ of the brace rod 9$^b$ where the rod is provided with a support 14$^b$ for the milk bucket. Adjacent the portion 11$^b$ the rod 12$^b$ is provided with a short rearwardly and downwardly bent portion 18. When the movable seat is in position for use, this bent portion 18 engages the under edge of the aperture 13$^b$ and prevents upward movement of the movable seat. When it is desired to move the seat upwardly the seat must be moved a slight distance forward until the bent portion is disengaged and will move through the aperture 13$^b$, allowing the members to take the position shown in dotted lines, when the rod 12$^b$ is used as a handle to carry the device. By the employment of this modification it will be seen that any danger of upsetting the milk pail, should the operator rise without having removed the pail from its support, is obviated.

I am aware that considerable variation is possible in the details of construction herein shown and described, without departing from the spirit of my invention, and I do not intend to limit myself thereto, except as pointed out in the following claims, in which it is my intention to claim all the novelty inherent in the structure shown and described as broadly as the state of the art will permit.

What I claim as new and desire to secure by Letters Patent is:

1. In a milking stool, the combination with a plurality of standards, of a seat supported thereon, a movable portion supported by said seat, a pail holder, and means between the movable portion and the pail holder whereby a movement of one member will cause a relative movement of the other.

2. In a milking stool, the combination with a plurality of standards, of brace rods therefor, a fixed seat supported by said standards and provided with an opening therethrough, a movable seat, a cross piece supported by said fixed seat and between said brace rods, provided with an opening therethrough, an arc shaped rod fixed upon said movable seat portion and passing downwardly and forwardly through the opening in the fixed seat portion and the opening in the said cross piece, a removable pail holding member attached to said rod at its lower extremity, said members being so located as to allow of relative movement thereof from a horizontal to a vertical plane.

3. In a milking stool, the combination with a movable seat, of a pail holder, means between said movable seat and the pail holder whereby a movement of one of said members will cause a relative movement of the other of said members, and means for preventing said relative movement whereby to hold the members in operative position.

In testimony whereof I affix my signature in presence of two witnesses.

FREDRICK A. PELLETIER.

Witnesses:
WILLIAM E. FRUSCHTIMETT,
ERNEST C. LUTHER.

---

Copies of this patent may be obtained for five cents each, by addressing the "Commissioner of Patents, Washington, D. C."